(12) United States Patent
Coscarella

(10) Patent No.: US 10,044,179 B2
(45) Date of Patent: Aug. 7, 2018

(54) METHOD OF INSTALLING ELONGATE BODIES IN A BUILDING

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 14/156,163

(22) Filed: Jan. 15, 2014

(65) Prior Publication Data

US 2014/0196271 A1 Jul. 17, 2014

(30) Foreign Application Priority Data

Jan. 15, 2013 (CA) ..................................... 2802269

(51) Int. Cl.
*E04C 3/14* (2006.01)
*H02G 3/22* (2006.01)

(52) U.S. Cl.
CPC ............... *H02G 3/22* (2013.01); *E04C 3/145* (2013.01); *Y10T 29/49826* (2015.01)

(58) Field of Classification Search
CPC .. H02G 3/22; H02G 3/26; H02G 3/28; H02G 3/286; E04C 3/145; Y10T 29/49826; Y10T 29/49861; Y10T 29/49872
USPC .......................................... 29/521, 450, 451
See application file for complete search history.

(56) References Cited

U.S. PATENT DOCUMENTS

| | | | | |
|---|---|---|---|---|
| 2,225,472 A * | 12/1940 | Franklin | ................ | H02G 3/083 152/427 |
| 2,407,023 A * | 9/1946 | Lockwood | ................ | 215/232 |
| 2,870,242 A * | 1/1959 | Wilkerson | ................ | F16L 5/00 138/110 |
| 3,424,857 A * | 1/1969 | Kipp | ................ | H02G 3/088 16/2.2 |
| 3,562,847 A * | 2/1971 | Jemmison | ................ | F16L 5/00 16/2.1 |
| 3,913,928 A * | 10/1975 | Yamaguchi | ................ | 277/604 |
| 4,041,241 A * | 8/1977 | Olmstead | ................ | H01B 17/308 174/153 G |
| 4,293,138 A * | 10/1981 | Swantee | ................ | 277/607 |
| 4,385,777 A * | 5/1983 | Logsdon | ................ | F16L 5/10 16/2.1 |
| 5,442,140 A * | 8/1995 | Mc Grane | ................ | F16L 5/10 174/151 |
| 5,452,494 A * | 9/1995 | Wright | ................ | F16L 41/088 16/2.2 |
| 5,732,440 A * | 3/1998 | Wright | ................ | H02G 3/083 16/2.2 |
| 5,836,048 A * | 11/1998 | Rossman | ................ | H02G 3/083 16/2.2 |
| 5,861,577 A * | 1/1999 | Tamura | ................ | F16L 5/10 174/50.56 |
| 6,494,463 B1 * | 12/2002 | Rank | ................ | 277/607 |
| 6,862,852 B1 * | 3/2005 | Beele | ................ | 52/220.8 |
| 7,802,798 B2 * | 9/2010 | Beele | ................ | 277/607 |
| 8,082,701 B1 * | 12/2011 | Wendel | ................ | E04C 3/145 52/100 |

(Continued)

*Primary Examiner* — Bayan Salone
(74) *Attorney, Agent, or Firm* — Christensen O'Connor Johnson Kindness PLLC

(57) ABSTRACT

A method of installing elongate bodies in a building includes the steps of providing a blocking body having one or more openings; blocking a hole in a support structure of a building with the blocking body, the hole passing through the support structure; and inserting at least one elongate body through at least one of the one or more openings in the blocking body.

14 Claims, 4 Drawing Sheets

(56) References Cited

U.S. PATENT DOCUMENTS

| | | | | |
|---|---|---|---|---|
| 8,357,854 | B2* | 1/2013 | Thompson | B29C 45/44 |
| | | | | 174/77 R |
| 8,413,312 | B2* | 4/2013 | Hartelius | F24J 2/5232 |
| | | | | 248/346.01 |
| 8,490,353 | B2* | 7/2013 | Beele | 52/220.8 |
| 8,833,014 | B2* | 9/2014 | Beele | 52/220.8 |
| 2001/0052564 | A1* | 12/2001 | Karlinger | 248/74.1 |
| 2004/0045233 | A1* | 3/2004 | Beele | 52/220.8 |
| 2010/0059941 | A1* | 3/2010 | Beele | 277/606 |
| 2010/0181728 | A1* | 7/2010 | Thompson | B29C 45/44 |
| | | | | 277/314 |
| 2011/0072631 | A1* | 3/2011 | Hartelius | F24J 2/5232 |
| | | | | 29/428 |

* cited by examiner

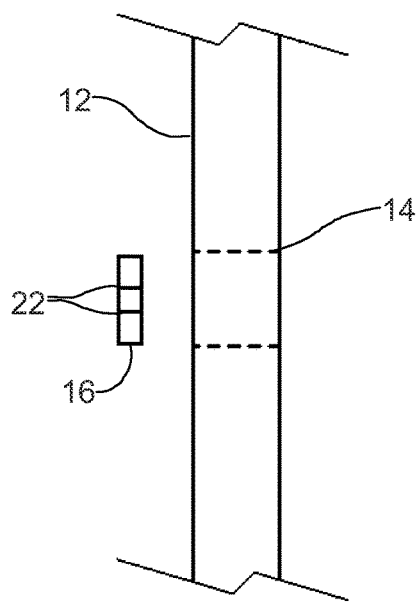
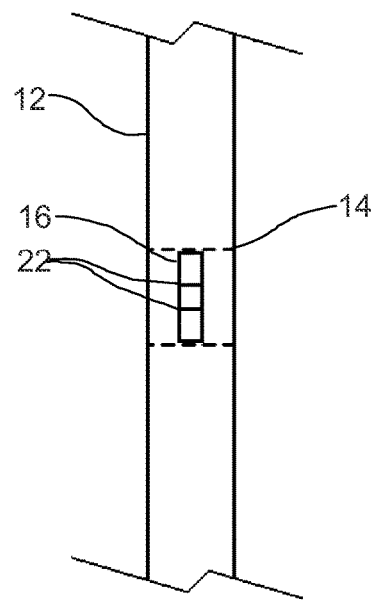
FIG. 4
FIG. 5
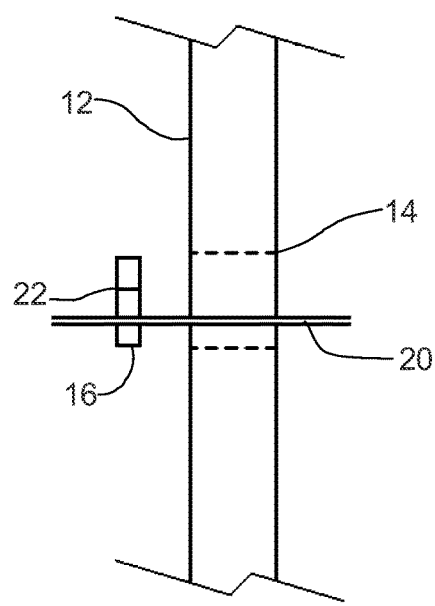
FIG. 6

METHOD OF INSTALLING ELONGATE BODIES IN A BUILDING

FIELD

This relates to a method of installing elongate bodies such as cables, conduits, etc., such as may be installed in a renovated or new home or building construction.

BACKGROUND

When installing cables such as electrical wiring, coaxial cables, Ethernet lines, telephone lines, etc. in a building, it is necessary to secure the cables at certain distances. This is generally done using staples or by passing the lines through holes in the support structure. Other elongate bodies, such as conduits including water lines, gas lines, etc., are also installed in buildings.

SUMMARY

There is provided a method of installing elongate bodies in a building, comprising the steps of: blocking a hole in a support structure of a building with the blocking body, the hole passing through the support structure; and engaging at least one elongate body within the one or more openings in the blocking body.

According to an aspect, the blocking body may be an elastomeric body having an outer diameter that is sufficiently large to allow the elastomeric body to be friction fit within an inner diameter of the hole, and further comprising the step of friction fitting the elastomeric body within the hole. The blocking body may be a sheet of material placed over the hole that completely covers the hole. The blocking body may seal around the one or more elongate bodies.

According to an aspect, the one or more openings may be formed by breaking a frangible connection within the blocking body. The one or more openings may be pre-formed in the blocking body. A plurality of elongate bodies may be inserted through the blocking body. The one or more openings may be spaced from an outer perimeter of the blocking body, or may be positioned at the outer perimeter of the blocking body.

According to an aspect, the blocking body may be a sealing body.

According to an aspect, the hole may be blocked by the blocking body before or after the at least one elongate body is inserted through at least one of the one or more openings.

According to an aspect, the at least one elongate body may comprise at least one of a cable and a fluid conduit.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIGS. 4 through 6 are side elevation views in section of a blocking body and elongate body being installed in a support structure.

DETAILED DESCRIPTION

When elongate bodies, such as electrical wiring, coaxial cables, Ethernet lines, telephone lines, water lines, gas lines, etc., are installed in buildings, it is often necessary to make holes in the support structure. However, the hole may increase the egress of air between the interior and exterior of the building, as air and moisture may enter or leave the building through the hole.

Figure 1:
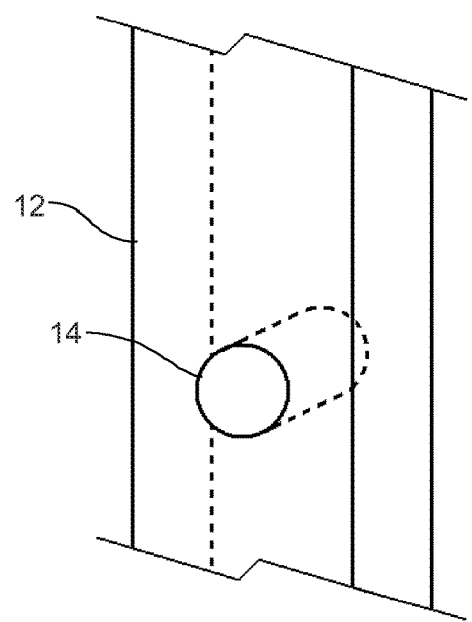
FIG. 1 is a front perspective view of a support structure of a building.

Referring to FIG. 1, there is shown a support structure 12 of a building. Support structure 12 may be a stud, such as a stud made from wood or metal that may be used in wall construction. However, support structure 12 may also be a section of panelling, trusses, cement, or any other component of a building that makes up its support structure as is known in the art. A hole 14 is formed in support structure 12. Hole 14 is large enough for elongate bodies to be installed therethrough. Hole 14 may be pre-formed in support structure 12 or may be formed after support structure is installed. Hole 14 may be a punch-out, held in place by a frangible connection.

Figure 2:
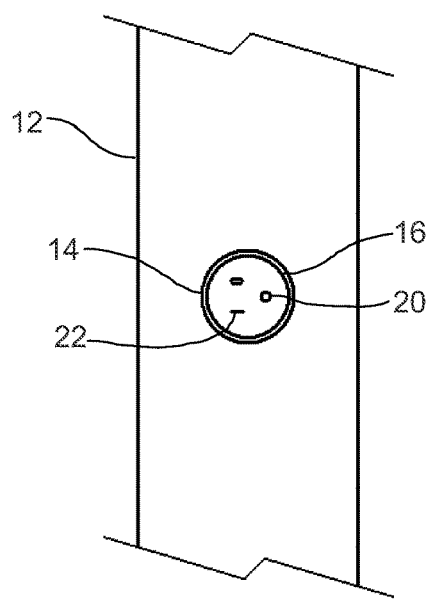
FIG. 2 is a front elevation view of a support structure with a blocking body installed.

Referring to FIG. 2, hole 14 is blocked by a blocking body 16. Blocking Body 16 preferably blocks the majority of the air passage through hole 14 and may seal hole 14, to prevent any egress of air or moisture through hole 14.

Figure 3:
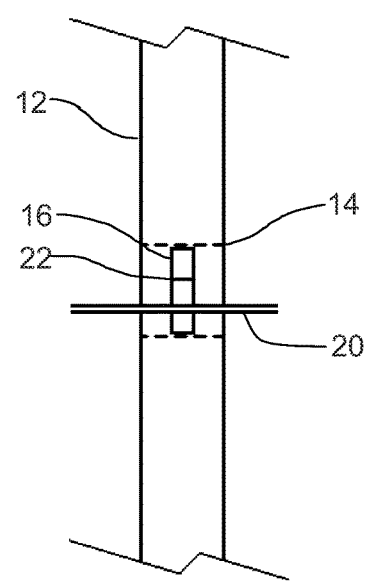
FIG. 3 is a side elevation view in section of a support structure with a blocking body installed.
Figure 7:
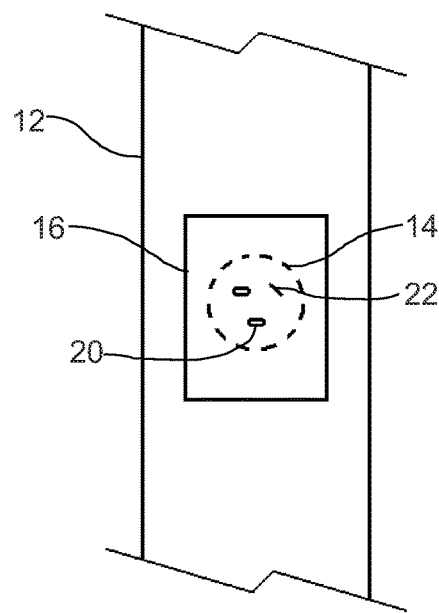
FIGS. 7 through 11 are views of alternative versions of blocking bodies.
Figure 8:
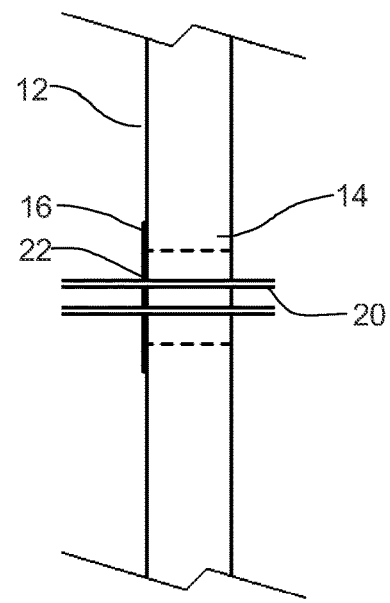
Figure 9:
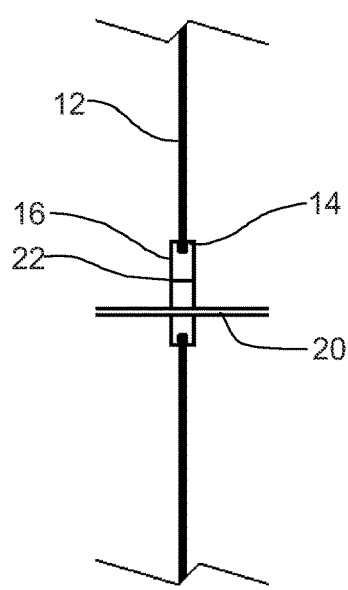
Figure 10:
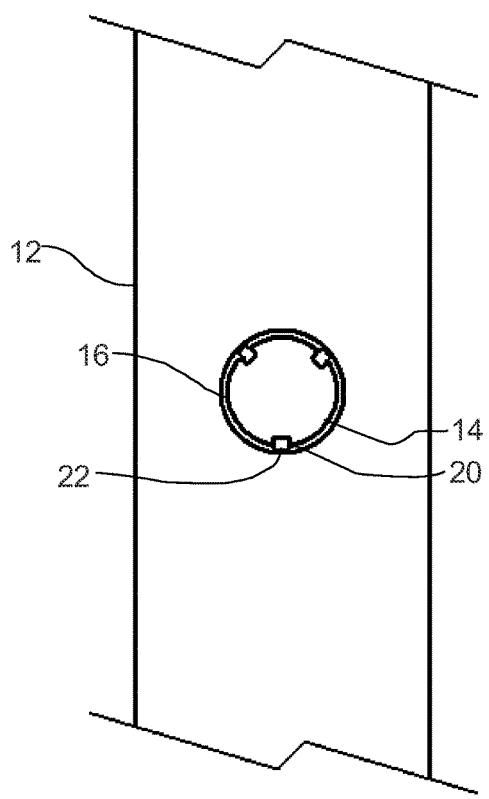
Figure 11:
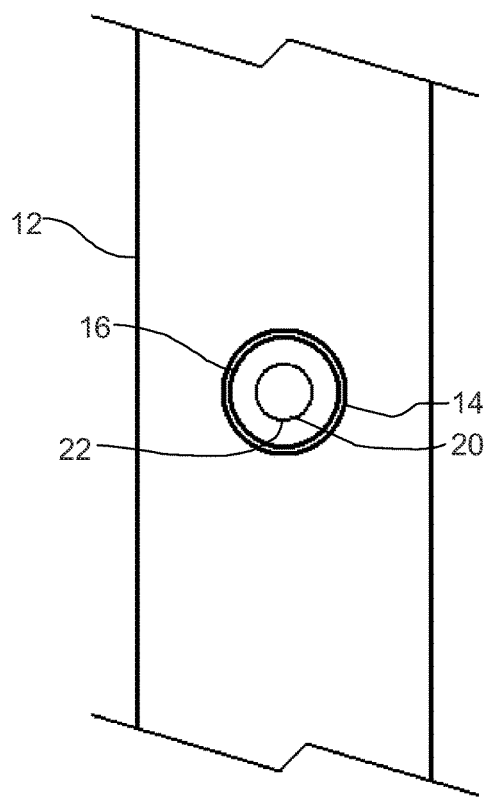

Blocking body 16 may be made from an elastomeric material, which improves its sealing ability. Blocking body 16 may have a diameter that is slightly larger than hole 14, such that it may be friction fit within hole 14, as shown in FIGS. 2 and 3. For example, blocking body 16 may be made from a foam material, or a resilient polymer, such that it may be compressed while being inserted and expand to seal or substantially block against an inner surface of hole 14. Alternatively, referring to FIGS. 7 and 8, blocking body 16 may be a sheet that is installed over one side of hole 14, such that it completely covers hole 14. Blocking body 16 may be tacked in place, attached using an adhesive, or other known method of attachment. As a further alternative, referring to FIG. 9, blocking body 16 may have a groove 18 in an outer perimeter of blocking body 16 with an outer diameter that is greater than the diameter of hole 14. This may be particularly beneficial when hole 14 is formed in a thin portion of support structure 12. Referring to FIG. 10, openings 20 may be positioned in the peripheral edge of blocking body 12, such that elongate bodies 20 are positioned against the inner surface of hole 14. In one example, blocking body 12 may be made from a deformable material such as rubber or rubber foam and made in the same general shape as hole 14. Openings 20 being formed as blocking body 12 is inserted into hole 14 with elongate objects 20 being held against the inner surface of hole 14. This is useful as elongate objects 20 may be held in any convenient position without concern for the orientation of blocking body 12 or for the number of objects 20 to be engaged. Referring to FIG. 11, it will be understood that, in addition to cables that are generally depicted in previous drawings, other elongate objects may be installed within blocking body 16, such as water lines, vent lines, etc.

As shown, elongate bodies 20 are installed through openings 22 in blocking body 16. Blocking body 16 may be installed before elongate bodies 20 are installed, as shown in FIGS. 4 and 5, or after elongate bodies 20 are inserted through openings 22, as shown in FIG. 6. Openings 22 may be pre-formed in body 16, or may be formed as needed. If the material is weak enough and elongate body 20 stiff enough, it may be sufficient to simply push through body 16 and form an opening 22 in that manner. Referring to FIG. 2, openings 22 may be circular, oval shaped, or simply a slit in body 16. An example of each is shown in body 16, although it will be understood that body 16 will generally be designed with the same shape of openings 22. Openings 22 may also be closed by a frangible connection, either by removing a knock-out, or by closing a slit. Alternatively, opening 22 may be formed at the time of installation using a cutting tool. If body 16 is elastomeric, opening 22 may be formed as smaller than the anticipated size of elongate body 20, such that it seals around elongate body 20 when installed. Preferably, openings 22 are self-sealing, such that whether elongate body 20 is installed or not, opening 22 is sealed. As shown, body 16 preferably has more than one opening 22 to allow for one or more elongate bodies 20 to be installed. Preferably, once installed, elongate bodies 20 are supported by body 16 to meet code as a elongate body support. Elongate bodies 20 may not have a circular cross-section, and may be oval, rectangular, etc. Furthermore, the size of elongate bodies 20 is not limited to small diameter elongate bodies such as electrical wiring or coaxial elongate bodies. Openings 22 may be designed or modified according to what is necessary to allow elongate bodies to be properly received within body 16.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A method of installing elongate bodies in a building, comprising the steps of:
   providing a blocking body having a first face at a first end of the blocking body, a second face at a second end of the blocking body, the second face being opposite and facing away from the first face, an outer surface between the first face and the second face, and one or more openings in the blocking body, from the first face to the second face, the blocking body being formed from a resilient material;
   forming a hole in a support structure of a building, the hole passing from a first side of the support structure to a second side of the support structure, the first side of the support structure being opposite and facing away from the second side of the support structure, the hole having an inner surface that results directly from the forming process and passing through the support structure;
   blocking the hole by inserting the blocking body such that the outer surface of the blocking body directly and resiliently engages the inner surface of the hole from the first face of the blocking body to the second face of the blocking body, the first face of the blocking body being flush with or recessed from the first side of the support structure and the second face of the blocking body being flush with or recessed from the second side of the support structure such that the blocking body is entirely contained within the hole formed in the support structure; and
   engaging at least one elongate body within the one or more openings in the blocking body.

2. The method of claim 1, wherein the blocking body is an elastomeric body having an outer diameter that is sufficiently large to allow the elastomeric body to be friction fit within an inner diameter of the hole, and further comprising the step of friction fitting the elastomeric body within the hole.

3. The method of claim 1, wherein the blocking body seals around the at least one elongate body.

4. The method of claim 1, wherein the one or more openings are spaced from the outer surface of the blocking body.

5. The method of claim 1, wherein the one or more openings are positioned at the outer surface of the blocking body.

6. The method of claim 1, wherein the one or more openings are formed by breaking a frangible connection within the blocking body.

7. The method of claim 1, wherein the one or more openings are pre-formed in the blocking body.

8. The method of claim 1, wherein the blocking body is a sealing body.

9. The method of claim 1, wherein the hole is blocked by the blocking body after the at least one elongate body is inserted through at least one of the one or more openings.

10. The method of claim 1, wherein the hole is blocked by the blocking body before the at least one elongate body is inserted through at least one of the one or more openings.

11. The method of claim 1, wherein a plurality of elongate bodies are inserted through the blocking body.

12. The method of claim 1, wherein the at least one elongate body comprises at least one of a cable and a fluid conduit.

13. The method of claim 1, wherein the hole is formed in a joist, stud or beam of the support structure.

14. The method of claim 13, wherein a thickness of the blocking body is less than a thickness of the joist, stud or beam such that, when inserted into the hole, the blocking body is recessed from each side of the joist, stud or beam.

* * * * *